G. A. WOODMAN.
JOURNAL BOX.
APPLICATION FILED NOV. 4, 1909.
1,015,607.
Patented Jan. 23, 1912.
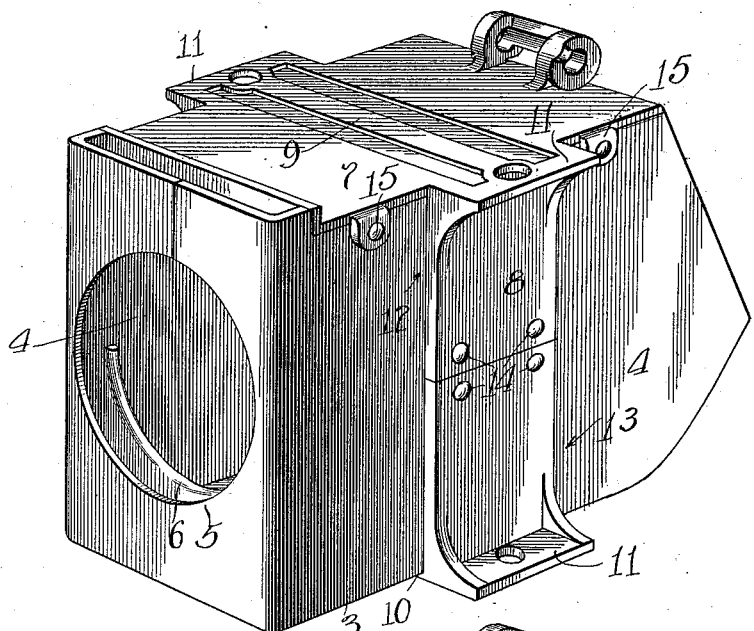
Fig. 1
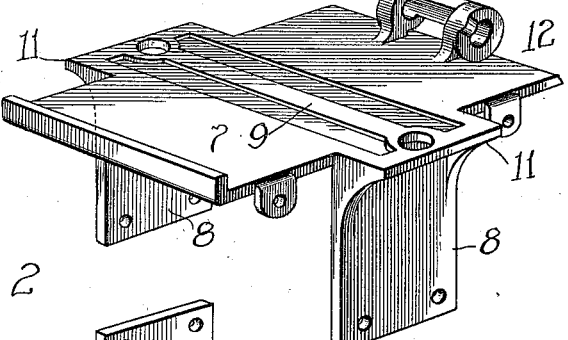
Fig. 2
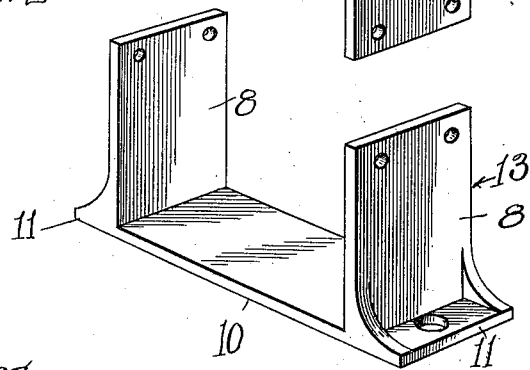
Witnesses
H. P. L. White
M. A. Kidd
Inventor
George A. Woodman
By Linthicum, Belt + Fuller
Attys.

UNITED STATES PATENT OFFICE.

GEORGE A. WOODMAN, OF CHICAGO, ILLINOIS, ASSIGNOR TO KIRBY EQUIPMENT COMPANY, OF CHICAGO, ILLINOIS, A CORPORATION OF ILLINOIS.

JOURNAL-BOX.

1,015,607.  Specification of Letters Patent.  Patented Jan. 23, 1912.

Application filed November 4, 1909. Serial No. 526,159.

*To all whom it may concern:*

Be it known that I, GEORGE A. WOODMAN, a citizen of the United States, residing at Chicago, in the county of Cook and State of Illinois, have invented new and useful Improvements in Journal-Boxes, of which the following is a specification.

This invention relates to journal boxes of the sectional or built-up type and comprises novel improvements on the invention forming the subject-matter of my companion application Serial No. 526,158 filed of even date herewith.

The object of the invention is to provide a strong and substantial sectional journal box of light weight which can be easily produced and assembled and at a comparatively low cost.

In the accompanying drawings illustrating one embodiment of the invention Figure 1 is a perspective view of the journal box and Fig. 2 is a detail perspective view of the cast or yoke section, the two parts thereof being separated to more clearly show the construction.

I have shown the invention in the form of a car axle journal box consisting, essentially, of a body section and a yoke section, the former being made of pressed steel and the latter of cast metal. The body section comprises a bottom 3, two sides 4 and the outer and inner dust guard walls 5 and 6, respectively. The cast or yoke section comprises a top 7 adapted to fit on the body section, two standards 8, the upper arch bar seat 9, the lower arch bar seat 10 and the column bolt lugs 11. In my other application above referred to the yoke section is made integral in one casting and this invention differs from that in the respect that the cast or yoke section is made in two parts, an upper part and a lower part, designated generally 12 and 13, respectively, dividing the standards, preferably, in half. For many purposes it may be preferable to follow the construction of my other application in making the yoke section integral in one casting and in some cases the present construction in which the yoke section is made in two parts may be preferable.

The present invention facilitates the production and assemblage of parts and at the same time provides a strong, rigid and substantial construction.

While I have shown the standards divided equally it may be desirable to divide them unequally by making the portions of the standard on one part of the yoke section longer than the portions on the other part or by making the portions on each part of unequal length, or otherwise. The body section and the yoke section are fastened together by rivets 14 and 15, or other suitable fastening means, arranged in any suitable manner.

What I claim and desire to secure by Letters Patent is:

1. In a sectional journal box, a yoke section cast in two parts adapted to surround and embrace a body section, one part of said yoke section comprising a top arch bar seat and portions of the standards, the other part comprising the bottom arch bar seat and the complementary portions of the standards, and means for securing the parts together.

2. In a sectional journal box, a pressed steel body section comprising a bottom and two sides, a yoke section comprising a top, two arch bar seats and two standards, said yoke section being cast in two parts adapted to fit together and inclose the body section, and means for fastening the body section and the yoke section together.

3. In a sectional journal box, a pressed steel body section comprising a bottom and two sides, a yoke section comprising a top, two arch bar seats and two standards, said yoke section being cast in two parts, a portion of the standards being made integral with the upper part of the yoke section and the other portion being integral with the lower part of the yoke section, and means for fastening the yoke section and the body section together.

GEORGE A. WOODMAN.

Witnesses:
 WM. O. BELT,
 M. A. KIDDIE.

Copies of this patent may be obtained for five cents each, by addressing the "Commissioner of Patents, Washington, D. C."